Sept. 7, 1954    T. E. DUNN    2,688,722
DIRECT CURRENT CONTROL SYSTEM
Filed Feb. 29, 1952
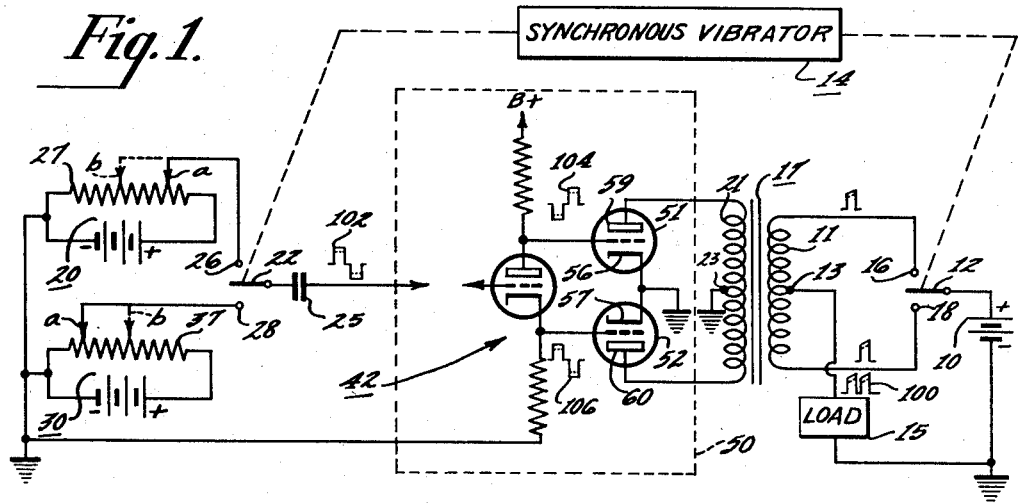
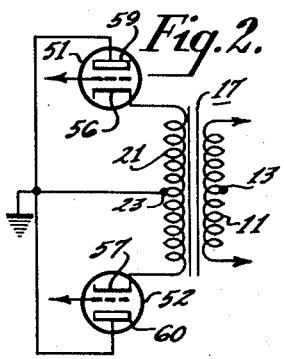 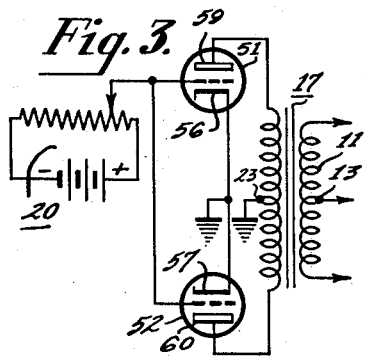 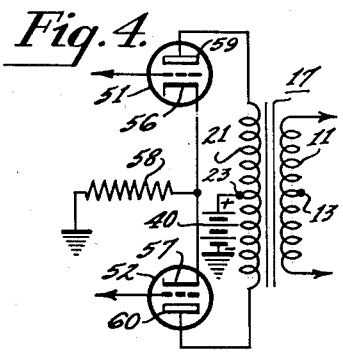
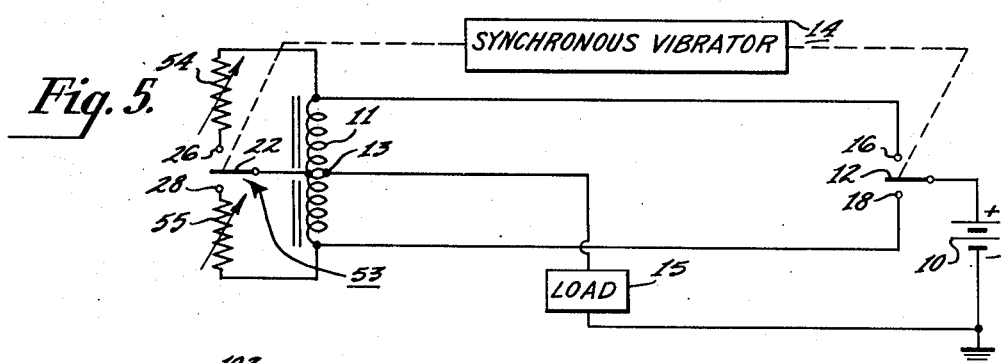
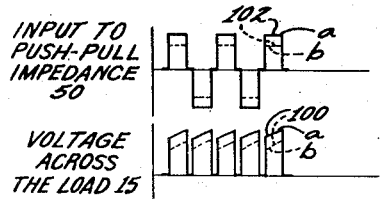
INVENTOR
Ted E. Dunn
BY
Morris L. Rabkin
ATTORNEY Patented Sept. 7, 1954

2,688,722

UNITED STATES PATENT OFFICE 2,688,722

DIRECT CURRENT CONTROL SYSTEM

Ted E. Dunn, Haddonfield, N. J., assignor to Radio Corporation of America, a corporation of Delaware Application February 29, 1952, Serial No. 274,227

9 Claims. (Cl. 323—86)

1

This invention relates to improvements in D. C. control systems.

In a known D. C. control system such as is shown and described in patent to S. Wald, Patent No. 2,508,082, entitled "Remote Control System for Direct Current Motors," a D. C. control voltage is converted into pulsing A. C., amplified in an A. C. amplifier, and rectified synchronously with the initial D. C. to A. C. conversion. The load power required to drive a D. C. load such as a motor, is supplied by a push-pull amplifier stage. The amplified D. C. control voltage is applied to the grids of the output tubes of the push-pull amplifier and is varied to vary the load current. In order to get maximum power out of the amplifier, the load impedance must be matched to the amplifier impedance. This is usually accomplished by means of a matching transformer. Where the load has a relatively large impedance, the voltage drop across the amplifier tubes and the current through them become large. This necessitates the provision of amplifier tubes which have a high wattage rating. Moreover, it requires the provision of a high voltage anode supply and a large filament current supply. As a result, the equipment cost is larger than necessary in low voltage and small filament systems and the efficiency of the system decreases while the probability of maintenance difficulties increases.

Therefore, it is a principal object of the present invention to provide a D. C. control system where the load power is not supplied by an amplifier stage.

It is a further object of the present invention to provide a variable D. C. voltage supply which does not require either a high voltage supply or a large filament current supply.

A still further object of the present invention is to provide a novel, inexpensive and efficient D. C. control system.

Another object of the present invention is to provide a D. C. control system where the load impedance does not have to be matched to the impedance of the controlling tubes.

These and other objects of the present invention are achieved by utilizing a pair of tubes connected as a variable push-pull impedance device rather than as a power amplifier. The main D. C. power is applied directly to the load by alternately connecting a first D. C. voltage source to the ends of the primary of a transformer which has its center tap connected to the load. The load current which passes through the primary is controlled indirectly by varying the impedance of

2 the push-pull output tubes which are connected in shunt across the secondary of the transformer.

In a preferred embodiment of the invention, the control voltage is derived by alternately coupling a second and a third D. C. voltage source to the push-pull impedance input through a capacitor. This provides a square-wave A. C. voltage which is then applied in push-pull to the output tubes. A synchronous vibrator is utilized to alternately connect the first D. C. voltage source to the ends of the transformer primary and to alternately connect the second and third D. C. voltage sources to the input of the push-pull impedance. This is done in such a manner that each push-pull output tube has the desired impedance during its conduction period.

The novel features of the invention as well as the invention itself, both as to its organization and method of operation, will best be understood from the following description when read in connection with the accompanying drawings in which:

Figure 1 shows a circuit diagram of an embodiment of the invention,

Figures 2, 3, and 4 show circuit diagrams of a few of the modifications possible in the circuit diagram of Figure 1, Figure 5 shows an equivalent circuit diagram of the circuits shown in Figure 1, and Figure 6 shows voltage wave shapes which occur during the operation of the circuit shown in Figure 1.

Reference is now made to Figure 1 wherein a circuit diagram of an embodiment of the invention is shown. A first D. C. voltage source 10, which provides the load power is connected to a first movable contact 12 of a synchronous vibrator 14. A first set of fixed contacts 16 and 18 of the synchronous vibrator are connected to opposite ends of the first winding 11 of the transformer 17. A center tap 13 of the first winding of the transformer is connected to a load 15. The load and the low voltage terminal of the first D. C. voltage source 10 are connected to ground. A second movable contact 22 of the synchronous vibrator 14 is connected through a coupling capacitor 25 to the input of the push-pull impedance 50. One of the fixed contacts 26 in the second set of synchronous vibrator contacts is connected to a second D. C. voltage source 20 and the other contact 28 is connected to a third D. C. voltage source 30.

The push-pull impedance 50 has single-ended input and a push-pull output. The signal applied to the single-ended input is amplified by as many stages as are required depending upon the amount of gain desired. These stages are not shown since they are well known in the art. The amplified signal is applied to a phase-inverter stage 42. Any type of phase inverter may be utilized such as that shown and described in a patent to Miesner, Patent No. 2,027,054, entitled "Amplifier System." The phase inverter stage divides the square-wave input which is applied through the coupling capacitor 25 to the push-pull impedance input, into two individual square-wave outputs which are 180 degrees out of phase. The output stage of the push-pull impedance 50 includes two electron discharge tubes 51 and 52 which have their cathodes connected to ground and their anodes 59 and 60 coupled to opposite ends of a second winding 21 of the transformer 17. A center tap 23 of the second winding of the transformer is connected to ground. An amplified A. C. control voltage is applied in push-pull to the grids of the output tubes.

Provision is made by means of potentiometers 27 and 37 for varying the amplitudes of the voltages applied to the push-pull impedance input.

Current passes through the load 15 in the same direction during each half of a cycle of the synchronous vibrator. During one half of a cycle, a current path is completed through the first movable contact 12 of the synchronous vibrator, the upper first fixed contact 16, one half of the first winding 11 and the load 15. During the other half cycle, current passes through the lower fixed contact 18, the other half of the first winding 11 and the load 15. The voltage developed across the load has a wave shape 100 which, as shown in Figure 6, is a pulsing D. C. This is also shown in Figure 1, adjacent to the load.

The second and third voltage sources 20 and 30 are applied alternately to the coupling capacitor 25 during successive synchronous vibrator half cycles by means of the second movable contact 22 of the synchronous vibrator, which alternately contacts the upper and lower ones of the second set of fixed contacts 26 and 28, to which the second and third voltage sources are connected respectively. It should be noted that synchronous vibrator as here defined is meant to include any means for alternately contacting two pairs of contacts in synchronism. A commercially available type of synchronous vibrator which may be used is that used in automobile radio receivers for D. C. to A. C. conversion, amplification and synchronous rectification. Only that part of the synchronous vibrator is shown which is relevant to the invention. It is assumed that filter circuits which are necessary to prevent contact arcing and the body of the vibrator can be supplied by one skilled in the art.

The voltage which appears at the input of the push-pull impedance is a square-wave A. C. voltage, represented by the wave shape 102 shown in Figure 6 and at the amplifier input in Figure 1. This input voltage has an amplitude which is proportional to the difference between the amplitudes of the voltages which are alternately applied to the coupling capacitor 25. This difference is varied by moving the slider of either one or both of the associated potentiometers 27 and 37. It should be understood, however, that any voltage control means can be used in place of potentiometers 27 and 37 such as an electron tube connected as a variable impedance means.

The square-wave A. C. voltage is applied to the push-pull impedance and is separated into two separate square-wave A. C. voltages which are 180 degrees out of phase. This is done in such a manner that the voltages which are applied to the grids of respective output tubes 51 and 52 have wave shapes 104 and 106 which are properly synchronized in time with the passage of current through the load. Specifically, this means that the push-pull output tubes must conduct alternately during successive synchronous vibrator half cycles and that the voltage appearing on the grid of an output tube must have an amplitude which will bias the tube to give the desired impedance.

In the manner of operation here considered, one tube 51 is made to conduct when the load current path is closed through the upper fixed contact 16. The synchronous vibrator is operated so that the second movable contact 22 contacts the second upper fixed contact 26 during the same period. Similarly, the other tube 52 is made to conduct when the load current path is closed through the lower fixed contact 18 and the second input contact 22 contacts the second lower fixed contact 28.

As is well known, the amount of alternating current which passes through the primary or first winding of a transformer, with a given voltage across it depends to a large extent upon the impedance connected across the secondary winding as well as the current through it. As the impedance across the secondary winding is decreased, current through the secondary increases and the primary current increases. As the impedance across the secondary is increased, the primary current decreases.

One explanation of this effect is that the primary must pass more current, as the shunting secondary impedance is decreased and as the current through it increases, to counteract the increased opposing voltage which is induced in the primary by the increase in current of the secondary. Another explanation may be found by considering an equivalent circuit, such as is shown in Figure 5, wherein it is assumed that the coupling between the primary and secondary winding of the transformer 17 is such that there is negligible flux leakage and that the transformer may be considered as a single inductor having the inductance of the primary winding. In the equivalent circuit shown in Figure 5 the transformer 17 is represented by its first winding 11, and the push-pull output tube impedance is represented by an equivalent push-pull variable impedance 53. The push-pull variable impedance consists of two variable resistors 54 and 55 each of which is equivalent to the reflected-to-primary impedance of one of the output tubes 51, 52 during its conduction. The synchronous vibrator is operated at a frequency such that the impedance presented by the equivalent inductance is large as compared to the equivalent shunting impedance 53. Thus, the larger part of the load current passes successively through each half of the equivalent shunting impedance and the load. Consequently, it is evident that the amount of current which passes through the load increases as the push-pull variable impedance is decreased and that the load current decreases as the push-pull variable impedance is increased.

The amount of load current control possible with a variation in the push-pull impedance depends upon the ratio of the equivalent inductance impedance to the equivalent shunting impedance 53. An ideal control is possible where the inductance impedance is infinite as compared to the shunting impedance. However, this is not practical because it requires either a very high frequency of synchronous vibrator operation or a very large transformer having a very high inductance. For practical purposes, therefore, it may be necessary to sacrifice part of the control in order to limit the size of the components utilized. Thus, the voltage across the load as shown in Figure 6 by wave form 100 is not a square-wave D. C. This is because the primary inductance passes some current and allows the induction field to partially collapse. With this operation, an ideal control is not possible although for practical purposes, it gives the control desired.

For the purpose of more clearly illustrating the operation of the invention, let us first consider the potentiometer sliders in position $a$ as shown by the solid lines in Figure 1. With the sliders in this position the input to the push-pull impedance appears as a voltage having a wave form 102$a$, as shown in Figure 6. The amplitude of this wave form is relatively large because the difference between the voltages which are alternately applied to the push-pull impedance is large. It should be noted that an input having the same amplitude but which is 180 degrees out of phase with that shown in Figure 6 can be derived by positioning each potentiometer slider at the opposite end from that shown in position $a$. When the potentiometer sliders are positioned as in position $b$ as shown by dotted lines in Figure 1, a voltage wave form 102$b$ appears at the amplifier input which has a smaller amplitude than the voltage wave form which appeared when the potentiometer sliders were in position $a$. As a result, the voltage wave forms which appear at the push-pull impedance output tube grids have much smaller amplitudes than the voltage wave forms which appears when the potentiometer sliders are in position $a$. With the system being operated in the manner described, as the second voltage source is varied to decrease the voltage applied to the upper second fixed contact and as the third voltage source is varied to increase the voltage applied to the second lower fixed contact the biasing voltages which are applied to the grids of the output tubes become more negative. The maximum negative voltage is applied to the grids when the second voltage source is adjusted to apply ground potential to the second upper fixed contact and the third D. C. voltage source is adjusted to apply its maximum voltage to the second, lower fixed contact. Thus, it can be readily seen that the variation in the voltages applied to the single-ended input of the push-pull impedance can be utilized to control the load current.

It is possible to operate the circuit shown in Figure 1 in a different manner than that described by changing the phase relationship between the synchronous vibrator operation by 180 degrees. Specifically, this means that the first upper fixed contact 16 can be contacted at the same time as second lower fixed contact is contacted. It is also possible to modify the circuit shown in Figure 1 without changing the invention. A few examples are shown in Figures 2, 3, and 4. In Figure 2, the output tubes of the push-pull impedance are connected with the cathodes 56 and 57 connected to opposite ends of the transformer secondary. The center tap 23 of the secondary winding is grounded as are the anodes 59 and 60. With this modification, the circuit is still operated as has been described for the circuit shown in Figure 1. Figure 3 shows a modification of the circuit shown in Figure 1 where it is not necessary to use a synchronous vibrator. This particular modification, however, would require the use of D. C. amplification stages where the control voltages are small. However, where large control voltages are available the modification of Figure 3 provides a simple operation. The grids of the output tubes are connected together with the single D. C. control voltage. In other respects, the output stage is the same as that shown in Figure 1 although other modifications such as shown in Figure 2 may be utilized. Figure 4 shows a modification of the circuit shown in Figure 1 where it is desired to overcome any losses which are effectively in series with the load. For this purpose, a fourth D. C. voltage source is connected between the center tap of the secondary winding and ground. A bias is provided for the output tubes by means of a cathode bias resistor 58 which is connected to the cathodes 56 and 57 of the output tubes. With the modification shown in Figure 4, the push-pull impedance 50 serves both as a variable impedance, in the manner described, and as a power amplifier.

From the foregoing description, it is readily apparent that the present invention provides a novel, efficient and inexpensive D. C. control system which does not require either a high voltage supply or a large filament current supply and wherein the load impedance does not have to be matched to the impedance of the controlling output tubes.

What is claimed is:

1. A D. C. control system comprising a transformer having a first and a second winding each having two ends and a center tap, means for alternately applying a D. C. voltage to the ends of the first winding of said transformer, means for connecting a load in series with said first winding center tap and said D. C. voltage applying means, and means connected across said second winding controllable, as desired, to vary the current through said second winding such that the voltage induced therefrom in said first winding varies the amount of voltage applied to said load by a desired amount.

2. A D. C. control system comprising a transformer having a first and a second winding each having two ends and a center tap, means for applying a first D. C. voltage alternately to the ends of said first winding, means for connecting a load in series with said first winding center tap and said means for applying a first D. C. voltage, and controllable means connected across said second winding, said controllable means being operated in synchronism with said means for applying a first D. C. voltage for varying the effective impedance presented by the half of said first winding between said first winding center tap and the end to which said means for applying a first D. C. voltage alternately is connected, whereby current flowing to said load may be controlled.

3. A D. C. control system as recited in claim 2 wherein said controllable means connected across the second winding includes two electron discharge tubes each having at least a cathode, an anode, and a control grid, the anodes of said tubes being connected to opposite ends of said second winding, and means for alternately applying D. C. control voltages to the grids of said tubes.

4. In combination, a transformer having a first and a second winding each having two ends and a center tap, means for alternately applying a first D. C. voltage to the ends of the first winding of said transformer, means for connecting a load in series with the center tap of said first winding and said first D. C. voltage applying means, means providing a point of reference potential, a connection between the center tap of said second winding and said point of reference potential, a push-pull variable impedance including two electron discharge tubes each having at least a cathode, an anode, and a control grid, the anodes of said tubes being connected to opposite ends of said second winding, and means for applying a control alternating voltage to the control grids of said tubes having a frequency determined by the frequency of the alternate connection of said first D. C. voltage applying means.

5. The combination as recited in claim 4 wherein said means alternately connecting said first D. C. voltage applying means to the ends of said first winding and said means for applying a control alternating voltage to the control grids of said tubes having a frequency determined by the frequency of the alternate connection of said first D. C. voltage aplying means includes a synchronous vibrator having a first set of two stationary contacts connected to opposite ends of said first winding, a first movable contact connected to said first D. C. voltage applying means, a second set of two stationary contacts having separate connections to said control alternating voltage applying means, a second movable contact, and means coupling said second movable contact to the control grids of said tubes.

6. A D. C. load control system comprising a transformer having a first and a second winding each having two ends and a center tap, means for alternately applying a first D. C. voltage to the ends of the first winding of said transformer, means for connecting a load in circuit with the center tap of said first winding and said first D. C. voltage applying means, a push-pull amplifier including two electron discharge tubes each having at least a cathode, an anode, and a control grid, the anodes of said tubes being connected to opposite ends of said second winding, means for applying operating potential to the center tap of said second winding, means for applying a controllable second and a controllable third D. C. voltage alternately to the control grids of said tubes respectively of said push-pull amplifier in synchronism with the alternate connection of said first D. C. voltage applying means.

7. A D. C. load control system comprising a transformer having a primary and a secondary winding each having two ends and a center tap, means for alternately applying a first D. C. voltage to the ends of said primary winding, means for connecting a load in circuit with the center tap of said primary winding and said first D. C. voltage applying means, a single-ended input, push-pull output A. C. amplifier including two output electron discharge tubes each having a cathode, an anode, and a control grid, the anodes of said tubes being connected to opposite ends of said secondary winding, means for alternately applying a second and a third D. C. voltage to the single-ended input of said A. C. amplifier in synchronism with the alternate connection of said first D. C. voltage applying means.

8. A D. C. control system comprising a transformer having a primary and a secondary winding each having two ends and a center tap, a push-pull variable impedance including two electron discharge tubes each having at least a cathode, an anode, and a control grid, the anodes of said tubes being connected to opposite ends of said secondary winding, an impedance having one end connected to the cathodes of said tubes, a synchronous vibrator having a first and a second set of contacts each of which includes two fixed contacts and a movable contact, said first set of fixed contacts being connected to opposite ends of said primary winding, means to apply a first D. C. potential to said first movable contact, means to apply a second, variable D. C. potential to one of said second set of two fixed contacts, means to apply a third, variable D. C. potential to the other of said second set of two fixed contacts, said second movable contact being coupled to the input of said push-pull impedance, means providing a point of reference potential, a connection between the center tap of said secondary winding and said point of reference potential, the other end of said cathode impedance being connected to said point of reference potential, and means for connecting a load between the center tap of said primary winding and said point of reference potential.

9. A D. C. control system comprising a transformer having a primary and a secondary winding each having two ends and a center tap, a push-pull variable impedance including two electron discharge tubes each having at least a cathode, an anode, and a control grid, the anodes of said tubes being connected to opposite ends of said secondary winding, an impedance having one end connected to the cathodes of said tubes, a synchronous vibrator having a first and a second set of contacts each of which includes two fixed contacts and a movable contact, said first set of fixed contacts being connected to opposite ends of said primary winding, means to apply a first D. C. potential to said first movable contact, means to apply a second, variable D. C. potential to one of said second set of two fixed contacts, means to apply a third, variable D. C. potential to the other of said second set of two fixed contacts, said second movable contact being coupled to the input of said push-pull impedance, means providing a point of reference potential, means for applying a fourth D. C. voltage to the center tap of said secondary winding, and means for connecting a load between the center tap of said primary and said point of reference potential.

No references cited.